Nov. 20, 1951  H. ROGERS ET AL  2,575,429
FOUR-BOTTOM TWO-WAY PLOW
Filed Jan. 14, 1946  3 Sheets-Sheet 2
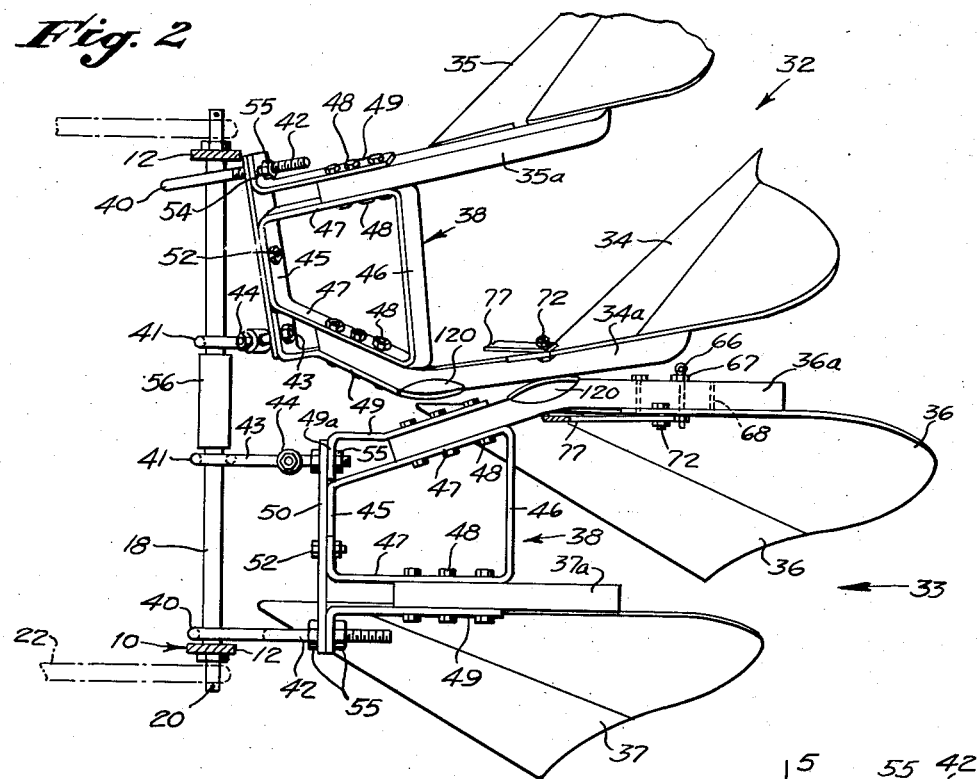
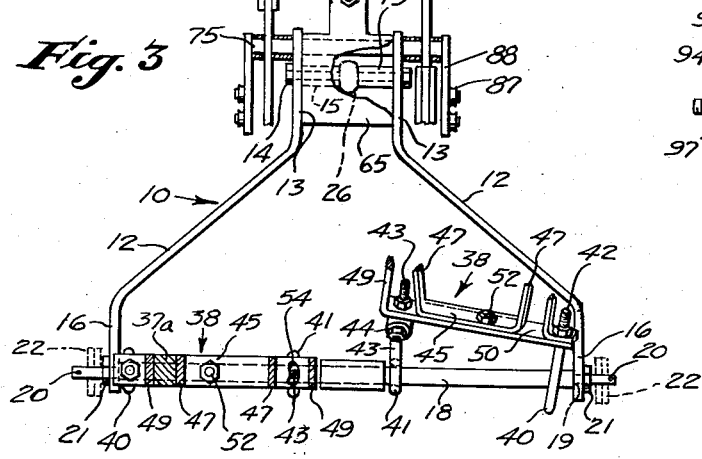
INVENTORS
HARRY ROGERS
WILLIAM FISK MELLEN
By HARRIS, KIECH, FOSTER & HARRIS
FOR THE FIRM
ATTORNEYS Nov. 20, 1951          H. ROGERS ET AL          2,575,429
                    FOUR-BOTTOM TWO-WAY PLOW
Filed Jan. 14, 1946                         3 Sheets-Sheet 3
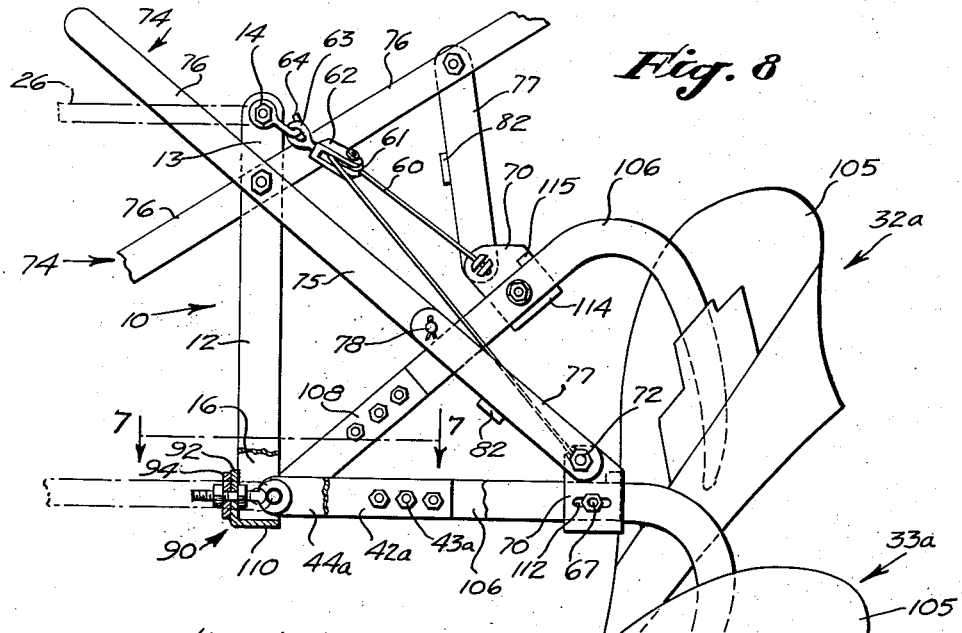
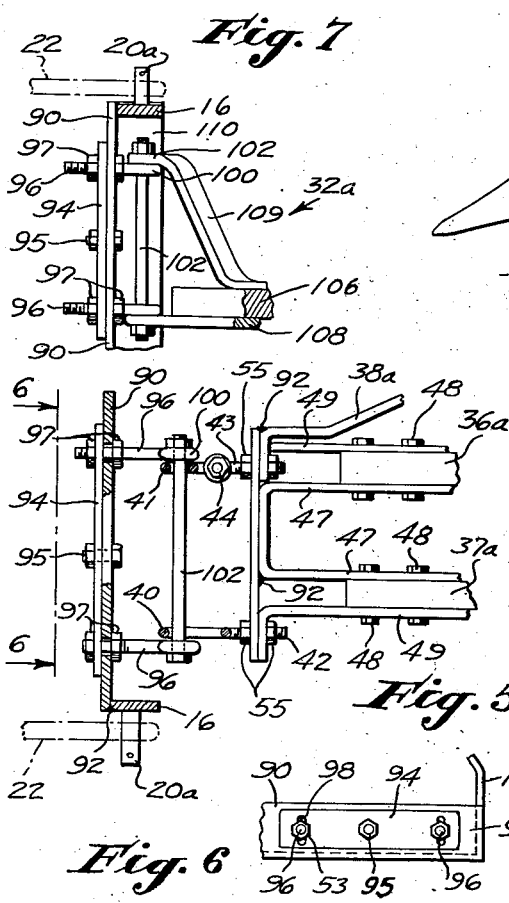
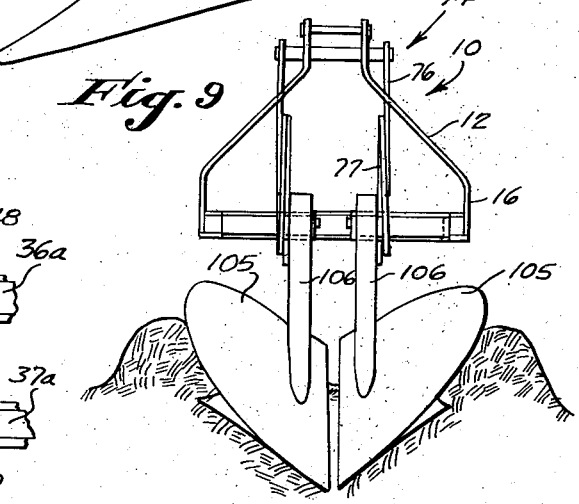
INVENTORS
HARRY ROGERS
WILLIAM FISK MELLEN
By HARRIS, KIECH, FOSTER & HARRIS
FOR THE FIRM
ATTORNEYS

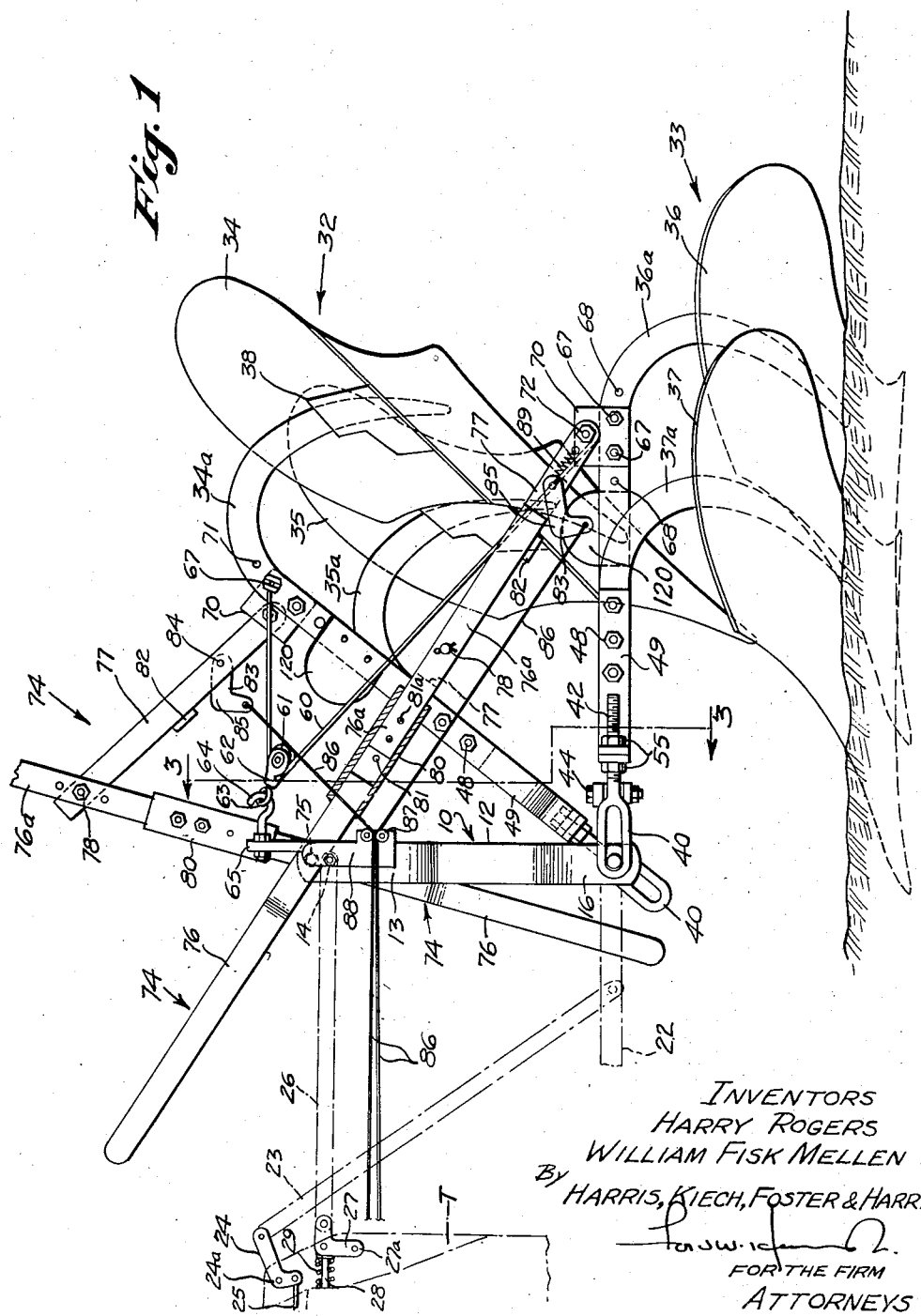

UNITED STATES PATENT OFFICE 2,575,429

FOUR-BOTTOM TWO-WAY PLOW

Harry Rogers, Bakersfield, and William Fisk Mellen, Whittier, Calif.; said Mellen assignor to Alice Marian Mellen, Whittier, Calif.

Application January 14, 1946, Serial No. 641,020

10 Claims. (Cl. 97—29)

This invention relates to plowing structures, and particularly to two-way plows adapted to be drawn by powered vehicles such as tractors, and to be controlled by conventional power lift mechanisms now commonly employed on tractors.

The principal object of this invention is to provide an efficient two-way plow structure which will enable the plowing mechanism to be drawn back and forth across a field in opposite directions whereby to plow new furrows alongside previously plowed furrows, all furrows being turned in the same direction.

A further object is to provide in a two-way plow structure means enabling the use of four plow bottoms arranged in two pairs and being so mounted that they may swing into proper operative alignment with respect to the wheels of the tractor when being moved into operative position.

It is a more general object of the invention to provide mountings for two-way plow structures such that the position of the plow bottoms may be laterally disposed to meet the plowing conditions, and also to adjust the set of the plow bottoms as may be required.

When plowing with a tractor, it is necessary so to arrange plow bottoms that one rear tractor wheel travels in a previously formed furrow, the plow bottoms forming adjacent furrows and turning the earth toward the mentioned previously formed furrow. In order that the tractor may be run back and forth across the field to form adjacent furrows turned in the same direction, oppositely pitched plow bottom units are employed, and these are so mounted that plow bottoms pitched in one direction are raised when plow bottoms pitched in the opposite direction are lowered. Desirably the plow bottoms are counterbalanced so that raising of one unit is accomplished simultaneously with the lowering of another. When a single plow bottom is used in each of the oppositely pitched units, the plow bottoms may be pivotally mounted side by side and will assume proper plowing positions with respect to the tractor wheels by simple raising and lowering operations and without the necessity for any lateral shift. However, it is not possible so to mount plow bottoms when two plow bottoms, faced in the same direction, are employed in each unit. This is because, when the four plow bottoms constituting the two units are so arranged that they would lie side by side if all were lowered at the same time, furrows being newly cut would not be properly spaced with respect to a previously cut furrow in which one rear tractor wheel conventionally travels whereby to act as a proper guide to plowing.

We have discovered that relatively simple plow-mounting mechanisms may be employed which will act to shift the operative pair of plow bottoms toward the median line of the tractor and plow structure when the plow bottoms are lowered into plowing position, and will provide a lost motion or equivalent connection that will result in a lateral tipping of the respective pair of plow bottoms under influence of gravity while approaching elevated position.

It is, therefore, a further object of this invention to provide in a two-way plow structure mounting means which will permit simultaneous raising and lowering respectively of two plow bottom units and will also permit outward and inward tipping of these plow bottom units during the raising and lowering operations, whereby the two units may clear each other as they are being raised and lowered and the lower unit may swing into operative alignment.

A further object is to provide an efficient adjustable mounting for each plow bottom unit, whereby rotary adjustment about a longitudinal axis will adjust the pitch of a respective plow bottom and whereby the angularity of such axis in a horizontal plane and with respect to the direction of travel may be adjusted to shift a respective plow bottom laterally to change its trailing position and to vary its width of cut.

Other features and objects of the invention will become apparent to those skilled in the art upon reference to the following specification and accompanying drawings.

In the drawings,

Fig. 1 is a side elevation of a two-way plowing structure having two counterbalanced units provided with two plow bottoms each, the lowered unit being shown in operative position;

Fig. 2 is a top plan of the structure of Fig. 1;

Fig. 3 is a vertical cross section taken approximately from the line 3—3 of Fig. 1 and shows a slightly modified construction of one of the plow-supporting frames;

Fig. 3a is a fragmentary detail of a connection used in Fig. 3;

Fig. 4 is a fragmentary side elevation showing a modified form of mounting;

Fig. 5 is a horizontal fragmentary view, partially in cross section and partially in plan, as indicated by the arrow 5 of Fig. 4;

Fig. 6 is an elevational detail taken from the line 6—6 of Fig. 5;

Fig. 7 is a cross sectional view taken from the line 7—7 of Fig. 8, and showing a further modified form of mounting;

Fig. 8 is a side elevation of a structure similar to that of Fig. 1 and showing two plows, each plow being carried by the mounting of Fig. 7; and Fig. 9 is a rear elevation indicating both plow units of Fig. 8 lowered into ditching position, the counterbalancing cable being disconnected for this purpose.

Referring to Figs. 1 to 3, in which a preferred form of the invention is illustrated, a frame 10, which is commonly known as an A-frame, is shown as a support for the plow structure of the present invention. This frame 10 comprises two vertically disposed, laterally inclined bars 12 which converge upward, Fig. 3, their upper ends 13 being in the form of short parallel sections which are inter-connected by a tie-bolt 14 on which are mounted spacing sleeves 15. The lower extremities of the bars 12 are bent to provide short vertical parallel sections 16 which are apertured to receive the ends of a transverse supporting shaft 18 which, in effect, constitutes a portion of the A-frame 10. The ends of the shaft 18 are shouldered as indicated at 19 whereby to provide reduced bearings ends 20 which project through apertures in the sections 16. The shoulders 19 serve to position the parts as required, and retainers 21, in the form of nuts or other means, carried upon the reduced bearing ends 20 hold the parts in position.

The A-frame 10, including the supporting shaft 18, is of that type which is conveniently supported by a power lift mechanism carried upon the rear of a tractor. This mechanism comprises the usual lifting arms 22, Fig. 1, whose forward ends are pivotally secured to rear framework T of a tractor, the rearward ends of the lifting arms 22 receiving the reduced ends 20 of the shaft 18. The arms 22 and the A-frame 10 are adapted to be raised and lowered through the means of lifting links 23 whose lower ends are pivotally connected with the intermediate portions of the arms 22 and whose upper ends are pivotally connected to outer ends of a double bell-crank 24 pivotally mounted, as indicated at 24a, upon the tractor framework T and actuated as through a rod 25 by means well known in the art, and forming, in itself, no part of the present invention. Cooperating with the lifting arms 22, is a horizontal positioning arm 26 whose rearward end is connected to the top of the A-frame 10 by being attached to the tie-bolt 14. The arm 26, which conveniently acts as a thrust rod, has its forward end pivotally connected to one end of a bell-crank 27 whose opposite end is pivoted at 27a upon the framework T, and whose intermediate portion is connected with a valve operating stem 28 which passes into the housing of the power lift mechanism and is conventionally operated against the compression of a spring 29. This mechanism also is well known in the art and, in itself, constitutes no part of the present invention. By these means the plow structure of this invention is carried and drawn forward in a well known manner.

The improved plow structure comprises a right hand plow unit 32 and a left hand plow unit 33. The right hand plow unit comprises an inner plow bottom 34 and an outer plow bottom 35, these plow bottoms being pitched toward the right. The left hand plow unit comprises an inner plow bottom 36 and an outer plow bottom 37, these plow bottoms 36 and 37 being pitched oppositely to the pitch of the plow bottoms 34 and 35, that is toward the left. For the purposes of brevity, the plow bottoms 34, 35, 36, and 37 will hereinafter be referred to merely as "plows." These plows 34 to 37 are respectively carried upon curved plow beams 34a, 35a, 36a and 37a, which in turn are mounted upon carriers in the form of frames 38 swingingly mounted upon the supporting shaft 18 by means of eyes 40 and 41, provided respectively on eye bolts 42 and 43, there being an eye 40 and an eye 41 for each of the frames. In each instance the eye 40 is elongated in order that it may slide transversely of the axis of the shaft 18, and provide a lost motion connection, while each eye 41 is circular and has substantially the same internal diameter as the diameter of the shaft 18. With this construction of eyes, the frames 38 may swing about the axis of the shaft 18, and the elongation of the eyes 40 will at the same time permit the respective frames 38 to tip laterally when being elevated. Such tipping may occur either by reason of a pivot joint 44 provided in each eye bolt 43 and having and axis perpendicular to the shaft 18, or by sufficient play of each eye 41 upon the shaft 18. Each frame 38 comprises a closed loop providing a forward rail 45, a rearward rail 46, and side rails 47 bound to the adjacent plow beams by means of bolts 48. On the sides of the plow beams opposite, from the side rails 47, outer arms 49 are disposed, these arms also being bound to the plow beams by the bolts 48. At the forward end of each of the frames 38 a cross-bar 50 is provided, this cross-bar being carried by the eye bolts 42 and 43 and having the forward rail 45 pivotally attached thereto by a pivot bolt 52. The eye bolts 42 and 43 project through holes in the corresponding ends of the respective cross-bars 50 and through curved slots 54 (Fig. 3a) in the adjacent transversely bent ends 49a of the adjacent outer arms 49, and these eye bolts 42 and 43 are adjustably secured in a suitable manner as by pairs of nuts 55. Or, this relationship of the parts 49 and 50 may be as shown in Fig. 3. Thus the frames 38 and the plows are mounted on the shaft 18.

By this mounting arrangement the frames 38 may be rocked about the pivot bolts 52, and with respect to cross-bars 50 and the shaft 18, by loosening the nuts 55 which are tightened to maintain the adjustment. Thus the pitch is varied. Also, by running the nuts 55 forwardly or rearwardly along the eye bolts 42 and 43 in opposite directions, the lateral angular positions of the plows may be varied and the width of cut adjusted. In operation, as each frame 38 rises, it may tip laterally outward, due to the ability of the respective elongated eye 40 to slide on the shaft 18 transversely to the axis of the shaft 18, such tipping taking place about the respective pivot 44, or by play in the eyes 41 on the shaft, as described. At the same time, the respective frames 38 are raised and lowered by swinging action around the axis of the shaft 18. Bodily shift of the eyes 40 and 41 axially along the shaft 18 is prevented by a spacing sleeve 56 disposed on the shaft 18 between the small eyes 41.

Since raising of one plow unit is to be effected simultaneously with lowering of the other plow unit, these units are preferably inter-connected in counterbalanced relation. This inter-connection is accomplished by means of a cable 60 which preferably is passed over a pulley 61. The pulley 61 in the form shown is carried in a block 62 provided with an eye 63 removably mounted upon a hook 64 secured in a plate 65 rigidly fixed between the upper ends 13 of the bars 12 of the A-frame; the securing of the plate 65 may be accomplished by welding. The ends of the cable 60 are respectively attached to the plow beams 34a and 36a, and preferably this attachment is such as to provide for adjustment of the effective length of the cable 60 and so that the suck of the plows may be varied if required. As shown in the drawings, such attachment is accomplished by employing eyes 66 on the heads of bolts 67 adapted to be placed in any of a plurality of holes 68 in the beams 34a and 36a, Figs. 1 and 2. The bolts 67 are also employed to secure upon the outer faces of the beams 34a and 36a plates 70 which also are adjustably mounted along their beams by reason of the plurality of holes 68, whereby to provide for such adjustment.

The plates 70 are respectively provided with pivot bolts 72 to which are connected the lower rearward ends of jointed levers 74 fulcrumed on the ends of a cross-bolt 75 carried in the upper ends 13 of the bars 12 of the A-frame. The jointing of each lever 74 is effected through the medium of two lever sections 76 and 77, the section 76 constituting a handle section and the section 77 constituting a rear section which is pivoted to the handle section by a pivot 78 and has its lower end attached to the respective plate 70 by the respective pivot bolt 72. Each jointed lever 74 is adapted to assume a straight line position when its plow unit is lowered, and to assume an angular position when its plow unit is raised, these two positions being illustrated in Fig. 1.

By depressing the outer end of the handle section 76 of the lever 74 whose plow unit is lowered the respective plow unit will be raised as the sections 76 and 77 approach the angular position illustrated. This raising operation is facilitated by the counter-balancing of the two plow units through the medium of the cable 60. Instead of shifting the adjustable plates 70 to adjust suck, it is preferable sometimes to provide a telescopic joint in the handle section 76 of each jointed lever 74. In this instance each section 76 includes an extension 76a which carries the pivot 78 and has its forward end disposed within a socket 80 provided on the rearward end of the principal member of the handle section 76. The sockets 80 and the ends of the extensions 76a have adjustment holes 81 to receive pins 81a for maintaining adjustment. When a plow beam is lowered into operative position, the respective lever 74, as a whole, operates as a brace to prevent elevation of the respective plow unit during use.

For the purpose of stopping the rearward end of each extension 76a in properly aligned position so that the whole of the respective jointed lever 74 is straight, a projecting stop block 82 is mounted on the lower edge of each rearward lever section 77 adjacent to the rearward end of the extension 76a when in lowered position. Preferably the relationship of these parts is such that the rearward extremity of the extension 76a is slightly past dead center position when the respective plow unit is lowered. If necessary, to assist breaking of the joint about each pivot 78 and eject the lower end of the extension 76a from its position past dead center, a triangular trip-plate 83 may be pivotally mounted adjacent the rearward end of each rearward lever section 77 by means of a pivot 84 which positions the trip-plate 83 on the same side of the section 77 as the extension 76a. Each plate 83 has a heel portion 85 which underlies the extremity of the extension 76a when the respective lever 74 is in straightened position, so that upon jerking a cable 86 attached to the lowermost tip of the trip-plate 83, the heel 85 thereof will engage and dislodge the lower end of the extension 76a. The cables 86 extend forward to the station of the driver of the tractor and are conveniently guided by small pulleys 87 mounted upon depending arms 88 carried by the ends of the cross-bolt 75 at the top of the A-frame. If desired, a spring 89 may have one end attached to the rearmost portion of each trip-plate 83, the other end of the spring 89 being affixed to an adjacent portion of the lever section 77, whereby to hold the trip-plate 83 constantly against the end of the extension 76a.

Another form of construction which may be employed for attaching the frames 38 to the A-frame 10 is shown in Figs. 4, 5 and 6, wherein the A-frame 10 includes the same inclined bars 12 with their lower parallel sections 16 as in Figs. 1, 2 and 3. In place of the supporting shaft 18 of the other form, a transverse supporting iron forming a beam 90 is employed, the lower sections 16 of the bars 12 being welded to the ends of the beam 90 with the forward edges of the sections 16 secured to the rear face of the beam 90. The reduced bearing ends 20 of the shaft 18 of the other form find their equivalent in bearing ends 20a welded upon the outer faces of the sections 16, or otherwise suitably provided adjacent the ends of the beam 90.

The supporting beam 90 and the bearing ends 20a thus perform in general the function of the supporting shaft 18, and the plow units are adapted to be mounted upon the beam 90 in much the same way that they are mounted upon the shaft 18. Frames 38a (Fig. 5), corresponding with the frames 38, are employed for this purpose, similar parts of the frames being designated by the same reference characters. However, there is no pivotal connection of the cross-bars 50 with the forward rail 45 and arms 49, and if desired, these parts may be welded together at 92. But the eye bolts 42 and 43 nevertheless may be longitudinally adjustable in their mountings by means of the nuts 55 to provide lateral shift of the plows and adjust width of cut.

To provide for pitch adjustment, a cross-bar 94 for each frame 38a is pivoted by a bolt 95 on the forward face of the beam 90, and eye bolts 96 are mounted in the ends of each cross-bar 94 and project through the beam 90, being adjusted and retained as by means of pairs of nuts 97. Each cross-bar 94 is adapted to swing in a vertical plane about its pivot bolt 95 as a center, and such swinging motion relative to the beam 90 is permitted by arcuate slots 98 (Fig. 6) in the beam 90 similar to the slots 54 of Fig. 3. The eyes 100 of the eye bolts 96 for each frame 38a carry a short shaft 102 in the form of a long bolt, and the ends of each shaft 102 receive the respective eyes 40 and 41 of the eye bolts 42 and 43 in the same way that the eyes 40 and 41 are carried on the shaft 18 of the device of Figs. 1, 2 and 3.

Here, pitch of plows is obtained by loosening the nuts 97, tipping the cross-bars 94 by reason of movement of the eye bolts 96 in the arcuate slots 98, and tightening the nuts 97. Lateral shift of the plows is accomplished by adjusting the nuts 97, or 55, or both, to change the effective lengths of the respective eye bolts and the angles of the plow beams with respect to the median line of the structure.

In using the form of attachment of Figs. 4, 5 and 6, the jointed levers 74, the counterbalancing cable 60, and other means of mounting the plows on the A-frame 10 and of connecting the A-frame to a tractor, may be the same as in Figs. 1, 2 and 3.

The last described construction for adjustment and width of cut may be employed also where each plow unit has only a single plow, as indicated in connection with plow units 32a and 33a shown in Figs. 7 and 8. In this form, only one plow 105 is provided on each short shaft 102, this plow being carried on a plow beam 106 secured between a straight arm 108 and an inwardly bent arm 109. The ends of these arms 108 and 109 are pivoted upon the ends of the respective short shaft 102, whereby the respective plow may be raised and lowered in a fixed path. If desired, the beam 90 in this form may join a bottom rail 110 and form an angle-iron therewith. As in the form of Figs. 4, 5 and 6, the tipping of the bars 94 and connected parts about the pivot bolts 95 by reason of movement of the eye bolts 96 in the arcuate slots 98, regulates the pitch of the plows and levels them when in operation in the earth. Such adjustment having been accomplished, it is maintained by tightening the nuts 97 so that they act as clamping means. Also as in the form of Figs. 4, 5 and 6, by adjusting the nuts 97 along the eye bolts 96 the effective lengths of the latter may be lengthened and shortened, thereby adjusting the lateral positions of the plows to regulate the width of cut.

In general, the attachment of the plow units 32a and 33a of Figs. 7 and 8, to the respective A-frame 10 may be accomplished by the same means as employed in Figs. 1, 2 and 3. However, in the particular arrangement of Fig. 8, some variations appear. Thus, the tie-bolt 14 to which the positioning arm 26 is attached is carried in the upper portions of the parallel sections 13 of the A-frame and the cross-bolt 75 upon which the jointed levers 74 are fulcrumed is carried in lower portions of the sections 13. The hook 64 receiving the eye 63 of the pulley block 62 is conveniently carried by the tie-bolt 14, although it may be attached to a plate corresponding with the plate 65 of the other form. The counterbalancing cable 60 passing over the pulley 61 is shown as having its ends attached to eyes carried by the pivot bolts 72 by means of which the rearward ends of the rear lever sections 77 are attached to the adjustable plates 70. The plates 70 are shown as being adjustable along the plow beams 106 by providing the plates 70 with slots 112 which adjustably receive the anchor bolts 67, only one bolt 67 being used for each plate. In order to position each plate 70 and retain it against oscillation, a laterally projecting elongated lug 114 is provided at the lower end of the respective plate 70 in position to hug the underside of the respective plow beam. In addition, a short lug 115 is carried on the corresponding face of each plate 70 in position to overhang the upper edge of the respective plow beam, whereby each plate 70 is properly located at all times.

In the form of construction of the jointed lever 74 of Fig. 8, only the handle section 76 and the rear lever section 77 are employed, these being connected by the pivot 78 and the movement of the lower end of the section 76 being limited by the projecting stop block 82 on the under edge of the rear section 77 as in the other form. With this construction of jointed lever, each lever serves to brace its plow when lowered into operative position. The suck of each plow is regulated by shifting the respective plate 70 along the respective plow beam through the medium of the slot 112, the respective lever 74 positively insuring corresponding operative positioning of the plow.

This last form of jointed lever may be used on all forms, if desired. Also, with this construction of jointed lever, especially when a single plow is used on each plow beam, the apparatus may be employed as a ditching device by detaching the eye 63 of the pulley block 62 from the hook 64, and lowering both plows at the same time, as indicated in Fig. 9. When so used, the jointed levers 74 support the plows in their lowered positions. Since the plows are pitched in opposite directions, forward movement will cause them to form a ditch.

When using the plowing structure of any of the forms Figs. 1 to 3, Figs. 4 to 6, and Figs. 7 and 8, the A-frame 10 is positioned upon the lifting arms 22 of the tractor by setting the reduced bearing ends 20 or 20a in the extremities of the lifting arms 22, the arms 22 being retained against dislodgment in any suitable manner, such as by the employment of cotter keys positioned in holes provided for that purpose at the extremities of the bearing ends 20 or 20a. The upper end of the A-frame 10 is positioned by attachment of the rearward end of the positioning arm 26 thereto by means of the tie bolt 14. The plow units 32 and 33 having been mounted upon the A-frame 10 as shown in Figs. 1, 2 and 3, the complete assemblage is adapted to be conventionally actuated by the power lifting mechanism to which the lifting arms 22 and the positioning arm 26 are attached. With the plow units 32 and 33 in their respective positions shown in Fig. 1, furrows having been plowed across a field by the plows 36 and 37 of unit 33, the tractor may be turned around and plowing continued back across the field to throw furrows in the same direction as previously, by raising the plow unit 33 and permitting the plow unit 32 to descend. This operation is readily accomplished by the driver of the tractor by depressing the adjacent end of the handle section 76 of the jointed lever 74 which is in a straightened position and nearest at hand. If breaking the joint is found difficult, such operation may be facilitated by jerking the respective cable 86 to cause the heel of the respective trip-plate 83 to dislodge the adjacent end of the extension 76a and move it out of its dead center position. Continued depression of the respective handle section 76 causes the plow unit 33 to be gradually elevated into the position occupied by the plow unit 32 as seen in Fig. 1, the relative positions of the jointed levers 74 being reversed. Inasmuch as the two plow units 32 and 33 are counterbalanced through the medium of the inter-connecting cable 60, relatively little effort on the part of the operator is required to effect the change of position of the two units.

However, in connection with the forms of Figs. 1 to 6, due to the fact that the double plow unit which is being lowered must assume a predetermined trailing position with respect to the tractor wheels, it must move inward toward the median line of the plow structure when in operation. In order to effect this movement, it is necessary that the rising plow unit tip laterally in an outward direction as it is elevated. As previously explained, this tipping is permitted by the elongated eye 40 of the plow unit being elevated, and the amount of tipping is limited by the striking of the inner end of the respective eye 40 against the supporting shaft 18. Corresponding movement of the other side of the rising unit, for example, the unit 33, is permitted by the pivot 44 in the end of the short eye bolt 43, or by a loose fit of the respective small eye 41 upon the shaft 18.

In so far as the jointed levers 74 are concerned, as the plow units shift laterally while moving between the elevated and lowered positions, such lateral movement is permitted merely by providing loose connections at the pivot bolts 72 and at the fulcrums on the ends of the cross bolts 75. The necessary play is indicated in part in Fig. 2.

As the plow units are simultaneously raised and lowered, the descending plow unit, due to the counter-balancing cable 60, tends to move toward the median line of the plow structure so that, in general, the plow unit which has just been lowered is at least approximately in proper operating position. Suitable curved, upstanding guard plates 120 (Figs. 1 and 2) may be provided to insure clearance of the beams 34a and 36a as they move past each other during ascent and descent.

However, if, when the tractor begins to move forward in its return trip across the field, the plow unit just lowered is initially not suitably aligned with respect to the tractor wheels, resistance of the earth to the plows upon forward draft by the tractor will cause the unit to swing into line and to draw the outer end of the respective elongated eye 40 into tractive position against the shaft 18.

Thus, by shifting the relative positions of the two plow units 32 and 33 at the end of each excursion across the field, plowing may continue progressively down the field, all furrows being thrown in the same direction.

In all forms, loosening of the nuts 55 or 97, as the case may be, and rocking the frames 38 or 38a about the pivots 52 or 95, so that the eye bolts 42 and 43 or the eye bolts 96 move in the arcuate slots 54 or 98, provide for leveling the plows and adjusting pitch. Similarly, in all forms, adjustment of the nuts 55 or 97 along the respective eye bolts to vary the effective lengths of the eye bolts causes lateral shift of the plows to vary the width of cut and also the alignment of the plows with respect to the tractor wheels.

It is also possible to use each of the present constructions as a ditching device by disconnecting the cable 60 and its pulley block 62 from the hook 63 so that both plow units 32 and 33 (or 32a and 33a) may be placed side by side when lowered. In this lowered position, each plow unit will be supported by means of its jointed lever 74. With the forms of Figs. 1 to 6, the adjacent plow beams 34a and 36a will be in contact with one another at an intermediate point. This will result in positioning both plow units at an angle to the median line of the structure so that the points of the plows 34 and 36 will toe in toward each other, whereby to perform a superior ditching function. Inasmuch as the outside plows 35 and 37 probably will be superfluous in any ditching operation, they may be detached by removing the respective attaching bolts 48, withdrawing the beams 35a and 37a and substituting any suitable spacer blocks corresponding in width with the plow beams, the respective bolts 46 being returned to restore rigidity to the frames 38. Such an arrangement is generally indicated in Fig. 9. It will be appreciated that, when the plows are in the ditching position the jointed levers 74 will not only suspend the plows in such ditching positions, but will also serve as braces to maintain them in their lowered positions. The construction of Figs. 7 and 8 may be employed for ditching in the same way as just described, there being the difference that there will be no outside plows to be detached.

When using any of the disclosed forms as ditchers, the bracing and locking levers 74 are adjusted to shorten their effective lengths, either by the socket connections 80, 81 or by shifting the plates 70, whereby to raise the rear ends of the plow beams and to hold the rear portions of the plows elevated with respect to their forward portions and thus tip the cutting edges appreciably downward and forward. Such positioning causes the two plows to form V-shape ditches rather than flat-bottom ditches. Also, the earth penetration is less than in plowing, the displaced earth forming elevated side banks which increase the effective ditch depth as illustrated in Fig. 9. Due to this decreased penetration, a tractor built to pull a given single plow, cutting for example 18 inches, and not adapted to pull two such plows at full plowing depth, can nevertheless pull the two inclined ditching plows at the indicated ditching depth. Such forming of V-shape ditches is further facilitated by the usual construction of the plows (plow bottoms) themselves. They are conventionally so built that, when a plow is in plowing position, the landslide is parallel to the ground level, the nose sloping downward an inch or a half-inch to give a natural downward pull or suck. The rear end of each plow beam is so arranged with respect to its plow that, when the tractor wheels are on level ground, the bottoms of the shares tilt upward and outward toward the sides, and so that, when the tractor wheel adjacent the operating plow drops into a furrow for plowing, the operative plow share assumes a position substantially parallel to the ground level and cuts a corresponding flat-bottom furrow. Thus, because of the tilted position of the shares when the tractor wheels are on level ground for ditching, two adjacent plows assume a broad V-shape, and when their rear ends are elevated they assume a narrower V-shape whereby to form a correspondingly pitched ditch.

By adjustment of the various eye bolts 43 and 96 and the jointed bracing levers 74, such set of the plows may be accomplished as may be necessary to yield the required shape of ditch. Also, adjustment of the eye bolts 43 and 96 may be relied upon to change the angularity of the plows horizontally to vary the width of cut, and also to rotate them about the longitudinal axes of their beams to vary their pitch, either for plowing or for ditching.

The use on an ordinary tractor of two plow bottoms in each plow unit is, of course, desirable because two furrows may then be plowed during each passage across a field instead of one. Advantages derived from the present improvement are found both in the provision for use of four plow bottoms in a two-way plow with the usual tractor, and in the simplicity of the construction by which each plow unit is shifted laterally to clear the other unit as the two units move between their lowered and elevated positions. The necessity for such shift is due to the fact that the usual width of the tractor tread is 52 inches, whereas the usual cut of each plow bottom is 14 inches, the cut for each unit thus being 28 inches. Thus, the operative locations of the two plow units overlap appreciably, somewhat as indicated in Fig. 2. By the present constructions it is possible to accomplish all the tipping that is required, and as a result an overall lateral movement of as much as eight or ten inches for each unit may be obtained.

Many variations of the generic invention herein disclosed will become apparent to those skilled in the art to which it pertains. It is intended, therefore, to protect all such modifications as fall within the scope of the claims.

We claim as our invention:

1. In combination in a plowing structure: plow supporting means; oppositely pitched plows; separate frames upon which said oppositely pitched plows are respectively mounted; means mounting said frames on said supporting means and providing bearings for swinging of said plows vertically about said supporting means as an axis; and means included in said mounting and bearing means providing for tipping of said frames laterally from and toward the median vertical plane of the structure as they ascend and descend to vary alignment of the respective plows, said plows being disposed with centers of gravity laterally outward with respect to said mounting means for said frames whereby said lateral tipping is effected through the medium of gravity.

2. In combination in a plowing structure: plow supporting means; oppositely pitched plows; separate frames upon which said oppositely pitched plows are respectively mounted; and bearing means mounting said frames on said supporting means for swinging of said plows vertically about said supporting means as a horizontal axis, said mounting and bearing means including lost motion connections providing for lateral tipping of said frames outward respectively as said plows and frames are elevated and for movement into operatively aligned position when lowered and being drawn forward, said lost motion connections including elongated eye means and shaft means receiving said eye means and supporting said frames.

3. In combination in a two-way plow structure: a plow supporting frame; a transverse shaft on said frame; a pair of plow carriers; oppositely pitched plows on said carriers; means providing bearing means and thereby pivotally mounting each of said carriers on said shaft for raising and lowering said plows about said shaft as a horizontal axis; and means connecting said carriers with said shaft and having means providing for tipping of said carriers and plows laterally outward with respect to said frame as the plows are raised and laterally inward as the plows are lowered, whereby said plows may move between an inward position when lowered and an outward position when raised, said means providing for tipping of each of said carriers including a pivoting connection and a sliding connection.

4. A combination as in claim 3 wherein said tipping means include sliding connections operable in a direction generally parallel to the direction of travel of the plow structure.

5. In combination in a two-way plow: a plow supporting frame; a transverse shaft carried by said frame; plow carrying means; a plow on said carrying means; means pivotally mounting said carrying means upon said supporting shaft for movement of the plow vertically about said shaft as a horizontal axis; and elongated means slidable transversely of and upon said shaft and providing for tipping of said plow carrying means laterally outward with respect to said frame as said plow is raised.

6. A combination as in claim 5 wherein said elongated means comprises an elongated eye through which said shaft extends.

7. In combination in a two-way plow: a plow supporting frame; a pair of plow carriers for oppositely pitched plows; means pivotally mounting said carriers on said frame for raising and lowering said carriers and their plows; means to connect said carriers and plows in counterbalanced relation for simultaneously lowering one carrier while raising the other; and jointed lever means connected with said frame and one of said carriers to effect raising and lowering, said lever means including a telescopic connection.

8. A combination as in claim 7 wherein said counterbalancing means includes a pulley on said frame and a cable passing over said pulley and adjustably attached to said carriers, said telescopic connection accommodating adjustment in cable attachment.

9. In combination in a plowing structure: plow supporting means; oppositely pitched plows carried by said supporting means to be raised and lowered with respect thereto; means interconnecting said plows and connectible with said supporting means for counterbalancing said plows, and adapted to be rendered inoperative for lowering the oppositely pitched plows into ditching position; and adjustable means connected with said plows for holding them suspended in operative plowing position and for suspending their rearward portions at higher positions for ditching.

10. A combination according to claim 9 wherein said adjustable means includes levers adapted to brace said plows in operative positions.

HARRY ROGERS.
WILLIAM FISK MELLEN.

REFERENCES CITED

The following references are of record in the file of this patent:

UNITED STATES PATENTS

| Number | Name | Date |
|---|---|---|
| 631,152 | Carroll | Aug. 15, 1899 |
| 880,724 | Davis | Mar. 3, 1908 |
| 1,078,846 | Gosnay | Nov. 18, 1913 |
| 1,090,133 | Caughey | Mar. 17, 1914 |
| 1,194,166 | Gaines | Aug. 8, 1916 |
| 1,302,339 | Esping | Apr. 29, 1919 |
| 1,318,036 | Wakefield | Oct. 7, 1919 |
| 1,362,277 | Watson | Dec. 14, 1920 |
| 1,383,251 | Waller | June 28, 1921 |
| 1,420,108 | Kinney | June 20, 1922 |
| 1,600,318 | Chisholm | Sept. 21, 1926 |
| 1,670,270 | Monson | May 15, 1928 |
| 1,767,114 | Bashor et al. | June 24, 1930 |
| 1,832,010 | Gallagher | Nov. 17, 1931 |
| 1,864,639 | Crezee | June 28, 1932 |
| 1,902,846 | Graham | Mar. 28, 1933 |
| 1,912,039 | Madill | May 30, 1933 |
| 2,204,487 | Glorfield | June 11, 1940 |
| 2,306,814 | Knapp | Dec. 29, 1942 |
| 2,312,616 | Altgelt | Mar. 2, 1943 |
| 2,344,474 | Tanke | Mar. 14, 1944 |
| 2,401,837 | Mellen | June 11, 1946 |
| 2,407,064 | Dewey | Sept. 3, 1946 |
| 2,424,192 | Rogers et al. | July 15, 1947 |
| 2,474,731 | Evans | June 28, 1949 |

FOREIGN PATENTS

| Number | Country | Date |
|---|---|---|
| 705,875 | France | Mar. 7, 1931 |
| 536,318 | Germany | Oct. 22, 1931 |
| 711,782 | Germany | Oct. 7, 1941 |
| 163,961 | Great Britain | June 2, 1921 |
| 544,041 | Great Britain | Mar. 25, 1942 |